United States Patent Office 3,755,433
Patented Aug. 28, 1973

3,755,433
ASHLESS LUBRICATING OIL DISPERSANT
Edward F. Miller, and Walter W. Hellmuth, Beacon, N.Y., assignors to Texaco Inc., New York, N.Y.
No Drawing. Filed Dec. 16, 1971, Ser. No. 208,978
Int. Cl. C10m 1/22, 1/32
U.S. Cl. 252—51.5 R  5 Claims

ABSTRACT OF THE DISCLOSURE

Polyisobutenyl-substituted N-aminoethylethanolamines are provided which function as ashless nitrogen-containing dispersants for lubricating oil compositions.

BACKGROUND OF THE INVENTION

Field of the invention

It is conventional to employ nitrogen-containing dispersants and/or detergents in formulated lubricating oil compositions. The dispersants function to keep foreign insoluble particulates dispersed throughout the lubricant so that they can be filtered out and also to prevent the deposition and accumulation of these bodies on critical areas of the engine.

Previously, nitrogen-containing dispersants were prepared as a reaction product of an amine or polyamine with an alkenylsuccinic acid or anhydride having sufficient molecular weight to impart oil solubility to the reaction product. More recently, dispersants have been disclosed which were prepared by reacting polyolefin polymers with polyamines resulting in the production of oil-soluble products containing from about 0.5 to 5 percent nitrogen. The effectiveness of a dispersant under both stop-and-go low temperatures and high temperatures produced by continuous high speed driving is at best uncertain and efforts are continuing to improve the performance of these oil additives.

DESCRIPTION OF THE PRIOR ART

U.S. Pat. 3,275,554 discloses ashless polyolefin-substituted polyamines and lubricants containing these additives. N-2-hydroxypropyl ethylene diamine is disclosed as a species of a hydroxyalkyl-substituted diamine which can be reacted with the polyolefin polymer to form a lubricating oil dispersant.

A method of preparing a general class of ethoxylated polyolefin alkylenediamine products is disclosed in a co-pending application, Ser. No. 155,286 filed on June 21, 1971.

SUMMARY OF THE INVENTION

Polyisobutylene substituted N - aminoethylethanolamines are provided in which the polyisobutenyl radical has an average molecular weight ranging from about 600 to 5000. These dispersants are characterized by being thermally stable, resistant to oxidation and highly effective in lubricating oil compositions over a wide range of operating conditions and temperatures.

DETAILED DESCRIPTION OF THE INVENTION

The compositions of the invention are relatively high molecular weight polyisobutenyl substituted N-aminoethyl ethanolamines which exhibit outstanding detergent properties when employed in a lubricating oil composition. These dispersants are represented by the formula:

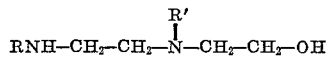

in which R and R' represent hydrogen or a polyisobutenyl radical having an average molecular weight ranging from about 600 to 5000, at least one of R and R' being said polyisobutenyl radical. The preferred materials are those in which the polyisobutenyl radical has a molecular weight ranging from about 800 to 3000 with the most preferred materials having a polyisobutenyl radical of 1000 to 1500 molecular weight. In general, these compositions will contain from about 4.6 to 0.5 percent by weight of nitrogen with the preferred nitrogen content being from about 2.8 to 1.8 percent as undiluted additive.

A surprising feature of the ashless dispersants of the invention is their thermal and/or oxidation stability when employed in lubricating oil compositions. In this connection, the structure of the compositions of the invention is considered to be critical since previously disclosed polyolefin substituted aminoalkylalkanolamine dispersants exhibit a susceptibility to oxidation and thermal instability that renders that additive and lubricating oil compositions prepared therefrom unsuitable for some lubricant applications.

The dispersant of the invention can be employed in both mineral and synthetic lubricating oil compositions. The mineral oil base can be paraffinic, naphthenic or a mixed mineral oil base of lubricating viscosity. In general, these mineral oils will have an SUS viscosity at 100° F. ranging from about 75 to 1300.

Suitable synthetic lubricating oils for preparing lubricants of the invention include the ester base oils prepared from polyhydroxy alcohols including pentaerythritol and trimethylolpropane and aliphatic monocarboxylic acids, polyglycols and thiols, silicone fluids, polyphenyl ether-thioethers and the like.

The dispersant is employed in a formulated lubricating oil at a concentration ranging from about 0.1 to 10 weight percent with the preferred concentration being from about 0.5 to 5 percent. Of course, oil concentrates of the dispersant can be prepared for subsequent addition to a finished oil blend. The composition of the concentrates is not critical and they can contain from 0.1 to 65 percent or more of the dispersant.

The following example illustrates the preparation of the specific dispersants of this invention.

EXAMPLE I

Polyisobutenyl (M.W. 1200)—Substituted N-amino-ethylethanolamine 2000 grams of chlorinated polyisobutylene (avg. molecular weight 1300 containing about 2.77% chlorine) was reacted with about 195 grams (1.87 mol) of N-aminoethylethanolamine and 102 grams (0.96 mol) of sodium carbonate. The mixture was heated at 350° F. for 3 hours and 400° F. for 1 hour. A stream of nitrogen was passed through the reaction mixture to remove the water of reaction. The reaction mixture was cooled, diluted with hexane and filtered. The filtrate was extracted with a mixture of methanol and isopropanol and the hexane solution stripped of solvent under vacuum to yield 1989 grams of product containing 0.8% N and 0.45% Cl.

EXAMPLE II

Following the procedure of Example 1, 1500 g. of chlorinated polyisobutylene (avg. M.W. 950 containing 3.84% Cl), 169 g. (1.62 mole) of N-aminoethylethanolamine, and 65 g. (1.6 mole) of sodium hydroxide were reacted to give 1490 g. of product containing 1.1% N and 0.36% Cl.

EXAMPLE III

Using the procedure of Example 1, 900 g. of chlorinated polyisobutylene (avg. M.W. 1300 containing 2.8% Cl) and 148 g. (1.42 mole) of N-aminoethylethanolamine were reacted to give a product containing 0.90% N and 0.62% Cl.

The ashless nitrogen-containing dispersant of this invention finds particular utility in mineral oil base motor oil compositions. The outstanding detergent, thermal stability and oxidation resistance properties of the dispersant of the invention and of formulated motor oil compositions containing this dispersant can be demonstrated in tests which subject the oil to severe high temperature engine conditions, such as are encountered in the Caterpillar 1–H and similar engine tests.

The dispersant properties of the additive of the invention were determined in Bench Sludge Tests. Formulated oil compositions containing particulate solid matter are prepared and thoroughly agitated to evenly disperse the particulate matter throughout the oil. The oil compositions are centrifuged and the depth of the sediment is measured and compared against a standard to show the effect of the dispersant. In Bench Sludge Test II, engine blow-by is included in the test mixture to increase test severity.

The base oil used in these tests was a solvent refined mineral oil having a SUS viscosity at 100° F. of about 325. The base oil contained appropriate amounts of conventional lubricating oil additives including an alkaline detergent, zinc dithiophosphate and polymethacrylate pour depressant. The oil containing the dispersant additive contained the additive of Example I at a concentration to provide 0.031% N. The results of the sludge tests are given in the table below.

TABLE I.—BENCH SLUDGE TESTS

|  | Bench sludge I (mm. sediment) | Bench sludge II (mm. sediment) |
|---|---|---|
| Base oil | 0.5 | 3.8 |
| Base oil plus dispersant of Example I | 0.1 | 1.2 |

The foregoing tests show a substantial reduction in the amount of sediment measured as a result of the effective dispersant properties of the additive of this invention.

We claim:
1. A lubricating oil composition comprising a major amount of a lubricating oil and a minor amount effective to impart dispersency of a composition represented by the formula:

$$RNH-CH_2-CH_2-\underset{\underset{R'}{|}}{N}-CH_2-CH_2-OH$$

in which R and R' represent hydrogen or a polyisobutenyl radical having an average molecular weight ranging from about 600 to 5000, at least one of R and R' being said polyisobutenyl radical.

2. A lubricating oil composition according to claim 1 in which the polyisobutenyl radical has an average molecular weight from about 800 to 3000.

3. A lubricating oil composition according to claim 1 in which the polyisobutenyl radical has an average molecular weight from 1000 to 1500.

4. A lubricating oil composition according to claim 1 in which R is polyisobutenyl having an average molecular weight of about 1200.

5. A lubricating oil composition according to claim 1 containing from about 0.1 to 10 weight percent of said dispersant.

References Cited
UNITED STATES PATENTS

| 3,282,839 | 11/1966 | Lee | 252—51.5 R |
| 3,392,118 | 7/1968 | Isaacson et al. | 252—51.5 R |
| 3,479,291 | 11/1969 | Clough | 252—51.5 R |
| 3,527,804 | 9/1970 | Cyba | 252—51.5 R |

WERTEN F. W. BELLAMY, Primary Examiner

U.S. Cl. X.R.

260—583